(12) United States Patent
Isoda et al.

(10) Patent No.: US 12,028,417 B2
(45) Date of Patent: Jul. 2, 2024

(54) SENSOR DEVICE ALLOCATION APPARATUS, SENSOR DEVICE ALLOCATION METHOD, AND SENSOR DEVICE ALLOCATION PROGRAM

(71) Applicant: Nippon Telegraph and Telephone Corporation, Tokyo (JP)

(72) Inventors: Takuma Isoda, Musashino (JP); Hirofumi Noguchi, Musashino (JP); Seisuke Arai, Musashino (JP); Akinori Shiraga, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/278,231

(22) PCT Filed: Feb. 24, 2021

(86) PCT No.: PCT/JP2021/006795
§ 371 (c)(1),
(2) Date: Aug. 22, 2023

(87) PCT Pub. No.: WO2022/180668
PCT Pub. Date: Sep. 1, 2022

(65) Prior Publication Data
US 2024/0146807 A1    May 2, 2024

(51) Int. Cl.
*H04L 67/12*    (2022.01)
(52) U.S. Cl.
CPC .................... *H04L 67/12* (2013.01)
(58) Field of Classification Search
CPC ........................................... H04L 67/12

USPC ......................................................... 709/224
See application file for complete search history.

(56) References Cited

U.S. PATENT DOCUMENTS

| | | | |
|---|---|---|---|
| 2017/0187783 A1* | 6/2017 | Pogorelik | H04L 67/12 |
| 2018/0013776 A1* | 1/2018 | Gay | G06N 20/00 |
| 2020/0342272 A1* | 10/2020 | Lin | G06F 18/24147 |
| 2020/0364583 A1* | 11/2020 | Pedersen | G06N 7/02 |

OTHER PUBLICATIONS

Han et al., "Camera planning for area surveillance: A new method for coverage inference and optimization using Location-based Service data," Computers, Environment and Urban Systems, Sep. 2019, 78(2019):101396, 15 pages.

* cited by examiner

*Primary Examiner* — Wing F Chan
*Assistant Examiner* — Leon Y Tseng
(74) *Attorney, Agent, or Firm* — Fish & Richardson P.C.

(57) ABSTRACT

A sensor device allocation apparatus that allocates a sensor device to an IoT service of the present invention includes a scoring unit that performs ranking of sensor devices satisfying a service requirement by an evaluation function based on specification conditions of the sensor devices and a scheduling unit that determines a control law of the sensor devices ranked by the scoring unit, in which the scheduling unit determines whether a service is satisfied based on collected data of the sensor device collected based on the control law, and the scoring unit corrects the evaluation function and repeats ranking of the sensor devices when the scheduling unit determines that the service is not satisfied.

7 Claims, 5 Drawing Sheets

SENSOR DEVICE ALLOCATION APPARATUS, SENSOR DEVICE ALLOCATION METHOD, AND SENSOR DEVICE ALLOCATION PROGRAM

CROSS-REFERENCE TO RELATED APPLICATIONS

This application is a National Stage application under 35 U.S.C. § 371 of International Application No. PCT/JP2021/006795, having an International Filing Date of Feb. 24, 2021, the disclosure of which is considered part of the disclosure of this application, and is incorporated by reference in its entirety into this application.

TECHNICAL FIELD

The present invention relates to a sensor device allocation apparatus, a sensor device allocation method, and a sensor device allocation program in an IoT service.

BACKGROUND ART

In recent years, it has become possible to connect a wide variety of enormous devices to a network, and Internet of Things (IoT) services for visualizing collection destination information based on information collected from IoT devices such as cameras or small sensors connected to the network and IoT services utilized for control of vehicles, robots, and the like have been increasing.

In particular, among the IoT devices, the number of monitoring cameras for the purpose of crime prevention or the like is increasing. Image information obtained from a camera has a larger amount of information than infrared rays, sounds, and temperature information acquired by other sensor devices. With the recent development of image analysis technology, a technology for extracting target information from an image has improved. Therefore, replacing conventional sensor devices for video monitoring with cameras is being considered with the decrease in cost of cameras. For example, person detection is performed by image analysis of a camera instead of a human sensor using infrared rays.

As a prior art for controlling use of a plurality of cameras, there is a technique called area coverage (see, for example, Non Patent Literature 1). This technique is a technique for performing optimum control for collecting data of a target area mainly for a camera with a minimum number of sensors at an optimum installation position. Specifically, Non Patent Literature 1 describes a method of installing a camera based on a posting position of a social networking service (SNS) and a position of a structure serving as a landmark in order to achieve area coverage in consideration of a data value.

CITATION LIST

Non Patent Literature

Non Patent Literature 1: Zhigang Han et al., "Camera planning for area surveillance: A new method for coverage inference and optimization using Location-based Service data", Computers, Environment and Urban Systems 78 (2019) 101396(2019).

SUMMARY OF INVENTION

Technical Problem

According to Non Patent Literature 1 described above, data collection in a demanded area can be performed, but it is not possible to determine whether data satisfying an IoT service that actually uses data can be collected.

In addition, in order to maximize the data value while suppressing the installation density of the sensor device to be low, it is desirable to appropriately control the sensor device and widen the effective collection range per sensor device. However, currently, there is only a cooperative control technology of the sensor device in a case where a requirement is clearly defined for one type of IoT service, and it is not possible to determine which IoT service has priority to control the sensor device and change the imaging range in an environment in which a plurality of IoT services is executed.

An object of the present invention is to select and control a sensor device that collects data in response to a new service request while reducing the quality of the IoT service being provided as little as possible when a new service request occurs in addition to the IoT service currently being provided.

Solution to Problem

In order to solve the above-described problems, a sensor device allocation apparatus that allocates a sensor device to an IoT service of the present invention includes a scoring unit that performs ranking of sensor devices satisfying a service requirement by an evaluation function based on specification conditions of the sensor devices, and a scheduling unit that determines a control law of the sensor devices ranked by the scoring unit, in which the scheduling unit determines whether a service is satisfied based on collected data of the sensor device collected based on the control law, and the scoring unit corrects the evaluation function and repeats ranking of the sensor devices when the scheduling unit determines that the service is not satisfied.

Advantageous Effects of Invention

According to the present invention, since the control law of the sensor device to be shared is formulated to satisfy the service requirements of the plurality of IoT services and the sensor device is allocated to the IoT service, the number of services satisfying the service requirements is maximized, and efficient data collection is possible while suppressing the installation density of the sensor device to be low.

DESCRIPTION OF EMBODIMENTS

Hereinafter, embodiments of the present invention will be described in detail with reference to the drawings.

In the following embodiments, a case where the sensor device is a camera connected to a network in an IoT service that observes an area at regular intervals, such as congestion analysis, people counting, and outsider detection of the predetermined area, will be described.

Here, it is assumed that the image quality, the imaging cycle, and the imaging range (direction and angle of view) of the camera, for which the sensor device allocation apparatus 1 according to the embodiment requests the control law, change according to the control law set by a sensor device allocation apparatus 1. The change of the imaging range is to change the swing range of the camera. As a result, one camera is shared by services having different imaging areas, image quality, and collection frequency.

Here, an outline of camera allocation processing performed by the sensor device allocation apparatus 1 in response to requests from a plurality of services will be described.

First, the sensor device allocation apparatus 1 performs the scoring of the camera with respect to the service requirement (camera installation position, imaging range, imaging direction, data quality, zoom magnification, and the like) of the requested service by the evaluation function indicating the application capability to the service prepared for each camera in response to the service request.

For example, an evaluation function ($S_A$) to be scored is a linear sum formula (1) obtained by weighting α, β, γ, and σ with the specification information based on the camera specification information of an installation position X, an imaging range Y, an imaging direction Z, and a data quality V of the camera.

$$S_A = \alpha X + \beta Y + \gamma Z + \sigma V \qquad \text{Equation (1)}$$

Then, the sensor device allocation apparatus 1 obtains the operation schedule of the camera with the constraint condition that the sum of the times when the camera is allocated to each service of the already supported service and the requested service does not exceed a certain upper limit for the camera with the higher score, and determines whether the number of services to be satisfied increases. That is, it is determined whether it is possible to support the requested service.

In a case where it is determined that the sensor device allocation apparatus 1 can support the requested service, the sensor device allocation apparatus 1 notifies the camera of the control law, performs area cutout or thinning on the image information notified of by the camera according to the schedule according to the service, and notifies each service of the image information as collected data.

Figure 1:
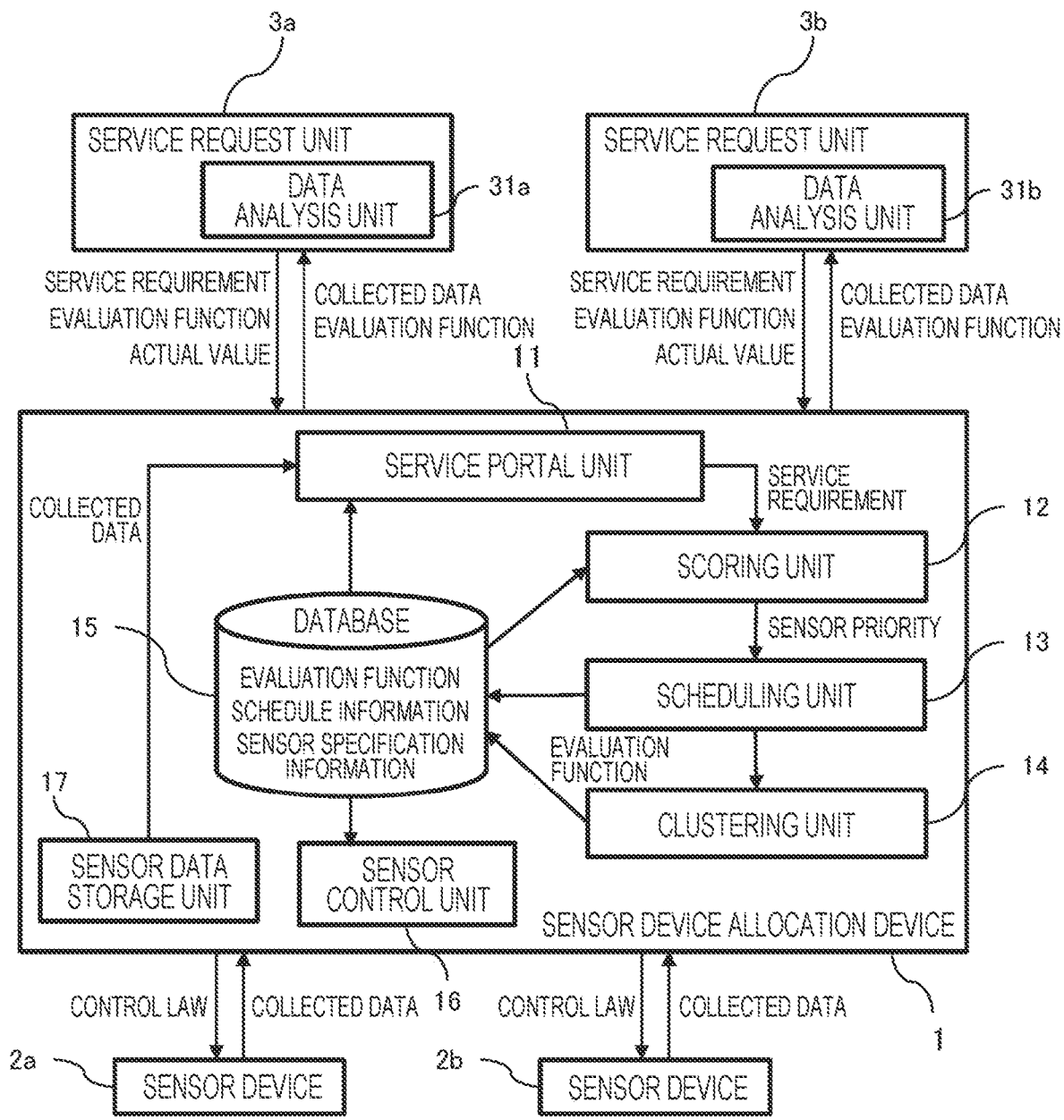
FIG. 1 is a diagram illustrating a configuration of a system to which a sensor device allocation apparatus according to an embodiment is applied.

FIG. 1 is a diagram illustrating a configuration of a system to which the sensor device allocation apparatus 1 according to an embodiment is applied.

FIG. 1 illustrates a system in which a sensor device allocation apparatus 1 according to an embodiment assigns two sensor devices 2a and 2b (cameras) to two IoT services in response to requests of the IoT services of two users or service providers, and notifies a user or a service provider of collected data (image information) of a sensor device 2 (camera).

Service request units 3a and 3b (which may be collectively referred to as a service request unit 3) are functional units that request a service in a user terminal that uses the IoT service or a service provider who provides the IoT service.

Data analysis units 31a and 31b (which may be collectively referred to as a data analysis unit 31) evaluate the usefulness of the collected data (image information) of the sensor device 2 in the service request unit 3, and calculate a scored actual value.

The service request unit 3 is connected to the sensor device allocation apparatus 1 via a network, and notifies the sensor device allocation apparatus 1 of service requirements such as camera image quality and collection frequency of the requested IoT service, an evaluation function group used in the initial assignment, and an actual value calculated by the data analysis unit 31, which will be described in detail later. In addition, the service request unit 3 is notified of the collected data (image information) related to the requested IoT service and the recommendation of the evaluation function group used in the initial allocation from the sensor device allocation apparatus 1.

Sensor devices 2a and 2b (which may be collectively referred to as a sensor device 2) are cameras installed at predetermined positions and in which image quality, an imaging cycle, and an imaging range (direction and angle of view) can be controlled.

The sensor device 2 is connected to the sensor device allocation apparatus 1 via a network, performs imaging according to a control law notified of by the sensor device allocation apparatus 1, and notifies the sensor device allocation apparatus 1 of imaged image information as collected data.

The sensor device allocation apparatus 1 includes a service portal unit 11, a scoring unit 12, a scheduling unit 13, a clustering unit 14, a database 15, a sensor control unit 16, and a sensor data storage unit 17.

The service portal unit 11 is connected to the service request unit 3 of the user or the service provider who requests the IoT service, and is a window of the user or the service provider used for the sensor device 2. The service portal unit 11 exchanges a service requirement, an evaluation function, an actual value, and collected data (image information) with the service request unit 3 via a network.

The scoring unit 12 obtains ranking (sensor priority) of the sensor devices 2 suitable for satisfying the service requirement using the specification information of the sensor devices 2 as a parameter. The ranking of the sensor devices 2 is performed by scoring the sensor devices 2 by the evaluation function of Equation (1) described above.

In addition, ranking may be performed by a machine learning algorithm that outputs an assumed rank using specification information of the sensor device 2 as input information.

Although details will be described later, the service portal unit 11 recommends an evaluation function type corresponding to the service requirement to the service request unit 3, and the scoring unit 12 performs scoring based on the evaluation function group (evaluation function type) selected by the service request unit 3.

The scheduling unit 13 sets the operation timing and the control law so that the sensor device 2 ranked high in the scoring unit 12 can be shared by a plurality of services. Specifically, the scheduling unit 13 derives the control law by mathematical programming based on the following rule.

The scheduling unit 13 sets, as a constraint condition, that the sum of the times for allocating the sensor device 2 to each service of the service already in response and the requested service does not exceed a certain upper limit. Then, the scheduling unit 13 sets the sum of binary values indicating the maximum number of times the quality of service set for each service satisfies the threshold as the objective function. When the service is satisfied, the binary value is 1.

In addition, the scheduling unit 13 determines whether the number of services satisfied for obtaining the control law of the sensor device 2 increases. In a case where the number of services does not increase, scheduling is performed on the sensor devices 2 ranked next.

Although details will be described later, in a case where it is determined that the service is not satisfied from the score (actual score) obtained by the data analysis unit 31 of the service request unit 3 based on the collected data collected by the sensor device 2 scheduled by the scheduling unit 13 and the above-described prior score, the scoring unit 12 corrects the weighting of the evaluation function of Equation (1) and performs scheduling by the scheduling unit 13 again. That is, the accuracy of the control law is improved by feeding back the evaluation of the actual collected data.

Since the set of weights ($\alpha$, $\beta$, $\gamma$, or the like) of the evaluation function of Equation (1) increases by the number of services, the clustering unit 14 prepares a variable space with the weight as a variable and performs clustering such as a k-means method to improve accuracy of the weight of the evaluation function selected when a new service is added. Then, the number of clusters having the smallest outlier and the smallest average variance is calculated, and an evaluation function group (evaluation function type described later) corresponding to the number of clusters is prepared. The weight of the evaluation function group is a median value of the cluster.

Then, the service portal unit 11 recommends an evaluation function group corresponding to the number of clusters to the service request unit 3 as an evaluation function type.

By clustering the evaluation functions in this manner, the evaluation function corresponding to the service requirement can be easily obtained.

The database 15 stores an evaluation function of the sensor device 2 corresponding to a service requirement of a service, schedule information for storing a control law and an operation schedule of the sensor device 2, and sensor specification information of the sensor device 2.

The evaluation function, the schedule information, and the sensor specification information of the database 15 are referred to or updated from the service portal unit 11, the scoring unit 12, the scheduling unit 13, the clustering unit 14, and the sensor control unit 16.

The sensor control unit 16 notifies the sensor device 2 of a control law based on the scheduling information of the database 15, and controls the sensor device 2 to operate in response to a service request.

Specifically, the sensor control unit 16 notifies the sensor device 2 of the control law of the image quality, the imaging cycle, and the imaging range (direction and angle of view) based on the scheduling information.

The sensor data storage unit 17 temporarily stores collected data collected by the sensor device 2 in accordance with the control law set by the sensor control unit 16, and notifies the service request unit 3 of the service request source of the collected data (image information) regarding the IoT service via the service portal unit 11.

At this time, the sensor data storage unit 17 notifies the image information in a multiplexed manner or performs region cutout or thinning of the image information to notify of the collected data collected from one sensor device 2 as the collected data to the service request unit 3 sharing the sensor device 2 according to the service requirement.

Next, the sensor device allocation operation in the IoT service to which the sensor device allocation apparatus 1 of the present embodiment is applied will be described with reference to the sequence diagram of FIG. 2.

Figure 2:
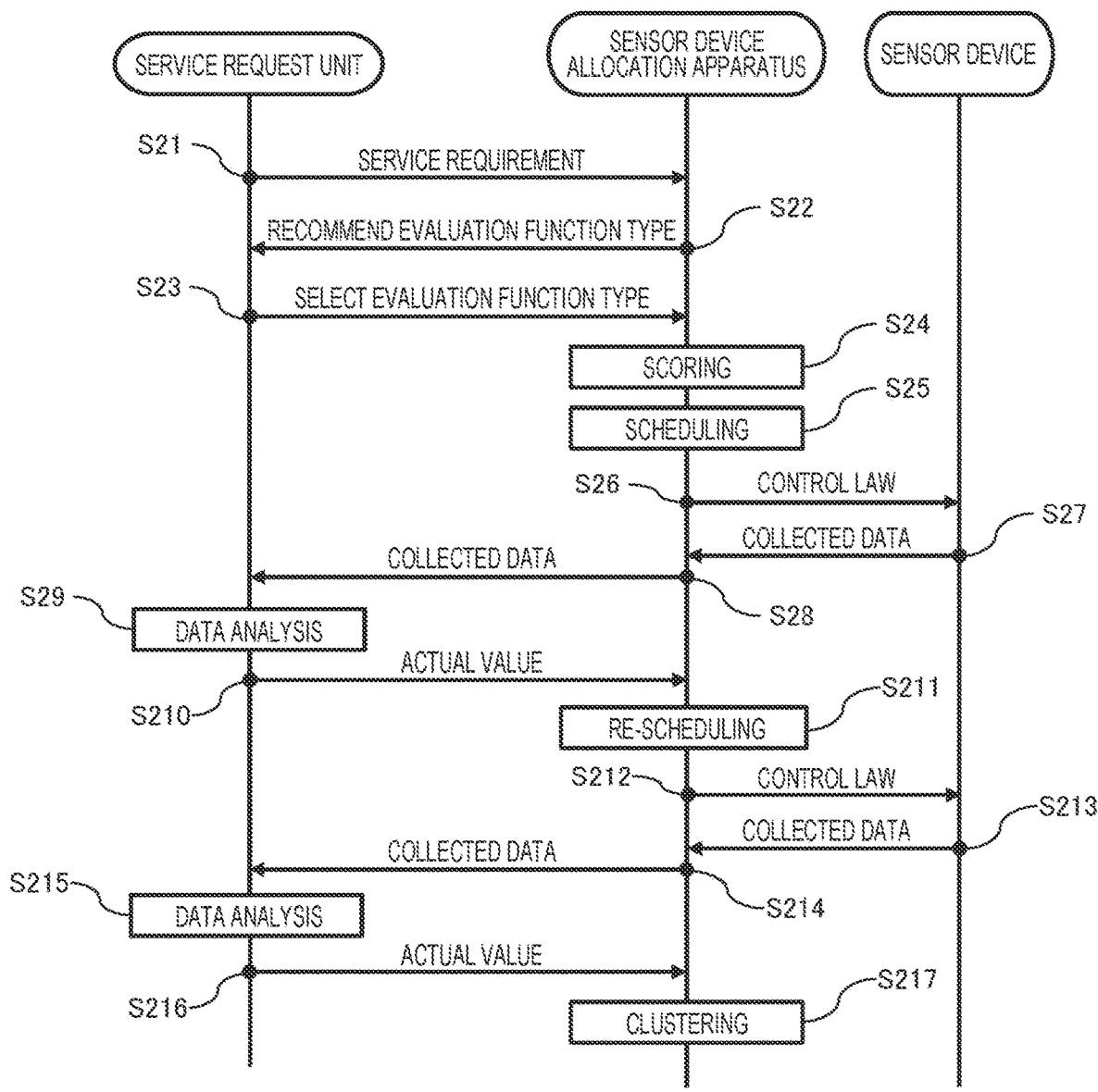
FIG. 2 is a sequence diagram for illustrating an allocating operation of a sensor device in a system to which the sensor device allocation apparatus is applied.

The sequence diagram of FIG. 2 is a diagram illustrating an information sequence among the sensor device allocation apparatus 1, the service request unit 3, and the sensor device 2. In a case where a plurality of service request units 3 or a plurality of sensor devices 2 are provided, the operation is performed in a similar sequence.

In step S21, the service request unit 3 notifies the service portal unit 11 of the sensor device allocation apparatus 1 of the service requirement (area information, image quality, collection frequency, or the like) of the IoT service.

In step S22, the service portal unit 11 recommends the evaluation function type obtained by the clustering unit 14 to the service request unit 3 in order of proximity to the service requirement. Specifically, in the service requirement, the evaluation function type is scored to determine an order close to the service requirement.

In addition, when the evaluation function type is recommended, a representative service name of the evaluation function type may also be written. As a result, the service request unit 3 can easily select the evaluation function type.

In step S23, the service request unit 3 selects an optimum evaluation function type from the evaluation function type recommended from the service portal unit 11, and notifies the service portal unit 11 of the selected evaluation function type.

In step S24, the scoring unit 12 scores the sensor devices 2 by the evaluation function of the cluster of the evaluation function type selected by the service request unit 3 and obtains ranking (sensor priority) of the sensor devices 2 suitable for satisfying the service requirement.

The scoring unit 12 refers to the score value in the initial assignment processing as a prior score, and refers to the evaluation function as a prior evaluation function.

In step S25, the scheduling unit 13 sets (schedules) the operation timing and the control law such that the sensor device 2 ranked in step S24 can be shared by a plurality of services.

In step S26, the sensor control unit 16 notifies the sensor device 2 of the operation timing and the control law set in step S25.

In step S27, the sensor device 2 notifies the sensor data storage unit 17 of the collected data (image information).

In step S28, the sensor data storage unit 17 notifies the service request unit 3 of the collected data (image information) via the service portal unit 11.

In step S29, the service request unit 3 causes the data analysis unit 31 to evaluate the usefulness of the collected data (image information) notified in step S28 and calculate a scored actual value.

For example, the data analysis unit 31 evaluates a difference between the number of counting persons detected by the service request unit 3 using another means (a person, a camera owned by the user, or the like) and the number of counting persons detected from the collected data, and scores the difference amount ratio. In this case, since the score decreases as the difference decreases, the reciprocal of the difference ratio may be used as the score value. In addition, the service request unit 3 may store an actual value obtained by scoring already performed services as a history, and the data analysis unit 31 may extract an actual value obtained by scoring the same type of services from the history.

In step S210, the service request unit 3 notifies the service portal unit 11 of the scored actual value calculated in step S29.

In step S211, the scheduling unit 13 compares the scored actual value notified in step S210 as the actual score with the prior score. Then, in a case where it is determined that the service is not satisfied, the scoring unit 12 corrects the weighting of the evaluation function of Equation (1), performs the scheduling by the scheduling unit 13 again, and sets the operation timing and the control law (re-scheduling).

The scoring unit 12 refers to the evaluation function corrected by the result score as an improvement evaluation function, and refers to the scoring value of the improvement evaluation function as an improvement score.

In a case where it is determined in step S211 that the service is satisfied by the scheduling unit 13, steps S212 to S216 are not executed.

In step S212, the sensor control unit 16 notifies the sensor device 2 of the operation timing and the control law set in the re-scheduling in step S211.

In step S213, the sensor device 2 notifies the sensor data storage unit 17 of the collected data (image information).

In step S214, the sensor data storage unit 17 notifies the service request unit 3 of the collected data (image information) via the service portal unit 11.

In step S215, the service request unit 3 causes the data analysis unit 31 to evaluate the usefulness of the collected data (image information) notified in step S214 and calculate a scored actual value.

In step S216, the service request unit 3 notifies the service portal unit 11 of the scored actual value calculated in step S29.

In step S217, the scheduling unit 13 compares the scored actual value notified in step S216 as the actual score with the improvement score, and in a case where it is determined that the service is not satisfied, the processing of steps S211 to S216 is repeated until the service is satisfied. By this feedback, the accuracy of the evaluation function is improved.

In a case where it is determined in step S217 that the service is satisfied, since the set of weights ($\alpha$, $\beta$, $\gamma$, or the like) of the evaluation function of Equation (1) increases by the number of services, the clustering unit 14 prepares a variable space having a weight as a variable and performs clustering such as the k-means method to improve accuracy of the weight of the evaluation function selected when a new service is added. Then, the number of clusters having the smallest outlier and the smallest average variance is calculated, and an evaluation function (evaluation function type described later) corresponding to the number of clusters is prepared. The weight at this time is a median value of the cluster.

Next, the operation of the sensor device allocation apparatus 1 of the present embodiment will be described in detail with reference to the processing flow diagrams of FIGS. 3A and 3B.

Figure 3A:
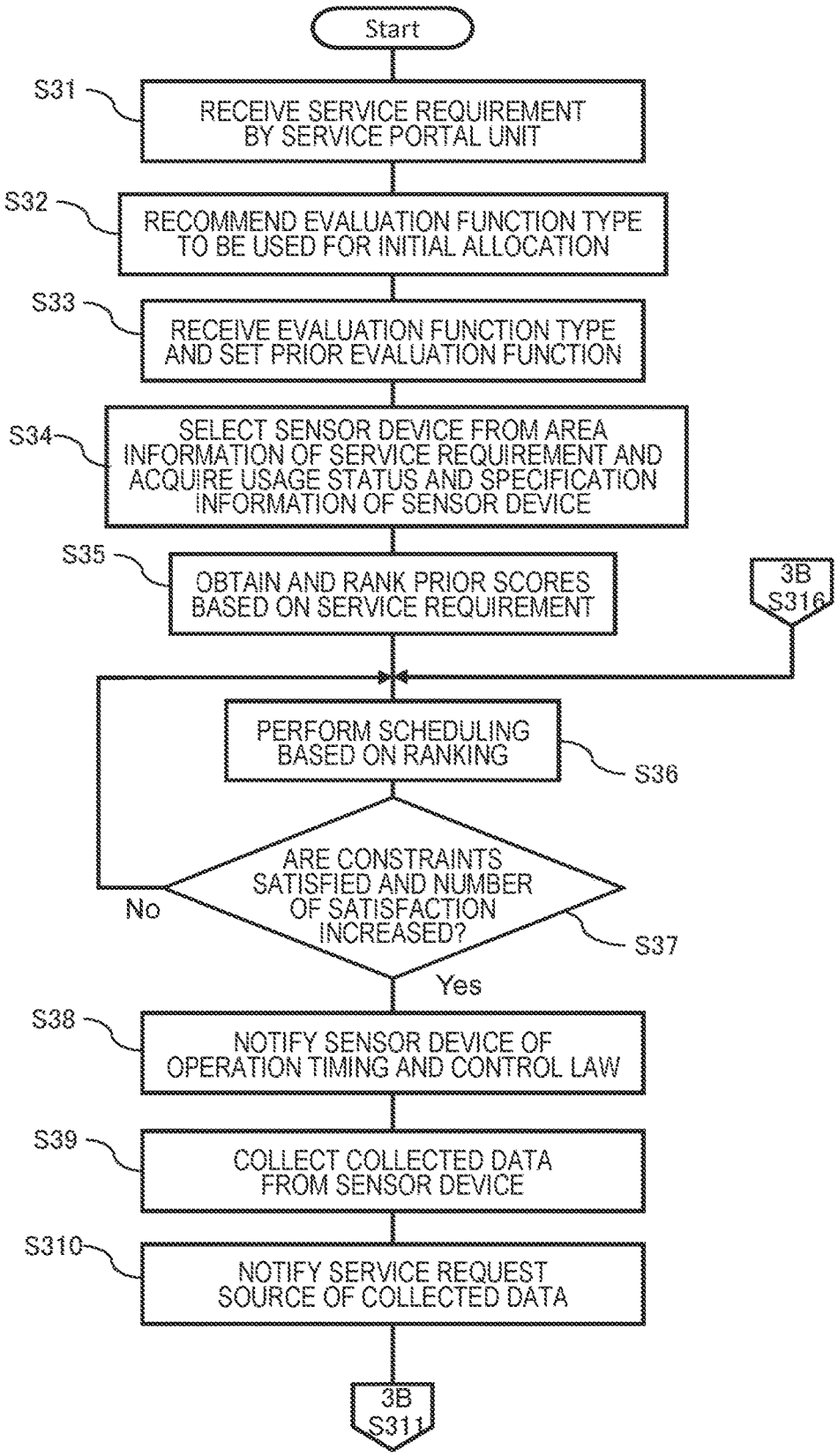
FIG. 3A is a processing flowchart for illustrating an operation of the sensor device allocation apparatus.

In step S31 of FIG. 3A, the service portal unit 11 receives the service requirement (are information, image quality, collection frequency, or the like) of the IoT service from the service request unit 3.

In step S32, the service portal unit 11 recommends, to the service request unit 3, evaluation function types to be used for initial allocation (scoring by the prior evaluation function) in order of proximity to the service requirement received in step S31.

In step S33, the service portal unit 11 receives the evaluation function type selected from the service request unit 3 and sets the prior evaluation function.

In step S34, the scoring unit 12 selects the sensor device 2 installed around the area information of the service requirement, and acquires the usage status and specification information of the selected sensor device 2.

Alternatively, the scoring unit 12 acquires the usage status and specification information of the sensor device 2 corresponding to the pre-evaluation function set in step S33.

In step S35, the scoring unit 12 scores the sensor device 2 based on the service requirement to obtain a prior score, and ranks (sensor priority) the sensor devices 2 suitable for satisfying the service requirement.

In step S36, the scheduling unit 13 performs scheduling so that the sensor devices 2 ranked in step S35 can be shared by a plurality of services, and obtains operation timing and a control law of the sensor devices 2.

In step S37, the scheduling unit 13 determines whether the number of services to be satisfied is increased by the scheduling in step S36. In a case where the number of services does not increase (No in S37), the process returns to step S36, and scheduling is performed on the sensor devices 2 ranked next. In a case where the number of services increases (Yes in S37), the processing proceeds to step S38.

In step S38, the sensor control unit 16 notifies the sensor device 2 of the operation timing and the control law obtained in step S36.

In step S39, the sensor data storage unit 17 collects collected data (image information) from the sensor device 2.

In step S310, the sensor data storage unit 17 notifies the service request unit 3 as a service request source of the collected data (image information) collected in step S39.

Figure 3B:
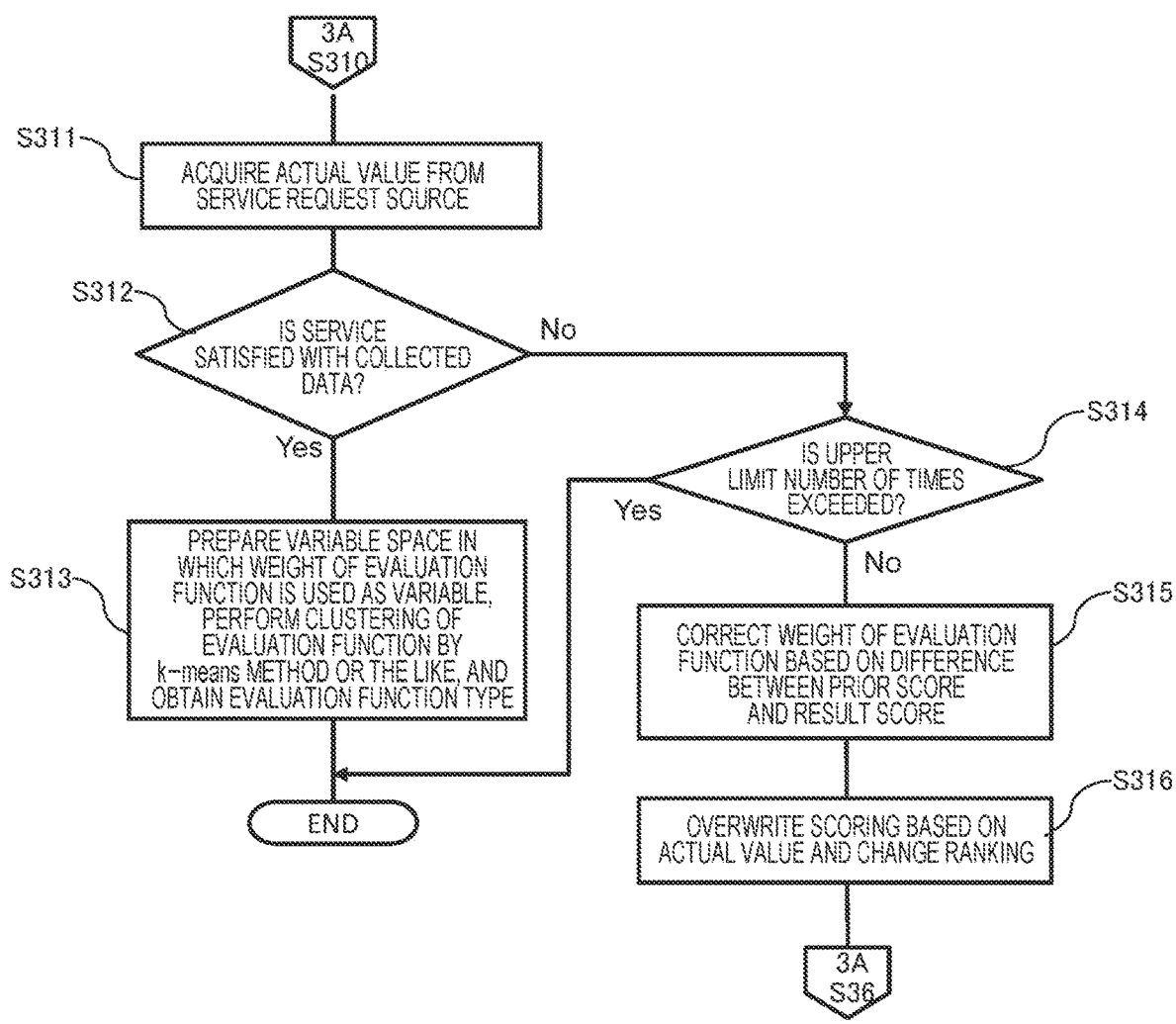
FIG. 3B is a processing flowchart subsequent to FIG. 3A.

Next, in step S311 of FIG. 3B, the service portal unit 11 acquires an actual value obtained by evaluating the usefulness of the collected data (image information) and scoring the evaluation from the service request source that has notified the collected data (image information) in S310.

In step S312, the scheduling unit 13 compares the scored actual value notified in step S310 as the actual score with the prior score or the improvement score, and determines whether the service is satisfied with the collected data. Here, in a case where the result score is larger than the prior score or the improvement score, it is determined that the service is satisfied.

In step S312, in a case where the scheduling unit 13 determines that the service is satisfied (Yes in step S312), the process proceeds to step S313. In a case where the scheduling unit determines that the service is not satisfied (No in step S312), the process proceeds to step S314, and the scheduling of the sensor device 2 is performed again (re-scheduling).

In step S313, the clustering unit 14 prepares a variable space in which the weight of the evaluation function is used as a variable, performs clustering such as the k-means method, calculates the number of clusters having the smallest outlier and the smallest average variance, prepares an evaluation function in which the weight corresponding to the number of clusters is the median value of the clusters, and ends the process using this as an evaluation function type.

In this evaluation function type, evaluation functions having similar weight distributions are aggregated, and when sensor device allocation is performed next time, the evaluation functions are recommended to the service request unit 3 in order of proximity to the service requirement in step S32.

In step S314, it is determined whether the upper limit number of times of re-scheduling is exceeded, and if not (No in S314), the process proceeds to step S315.

In a case where the number of times exceeds the upper limit number of times of re-scheduling, the scheduling unit 13 notifies the service request source that the sensor device allocation satisfying the service cannot be performed, and ends the processing.

In step S315, the scoring unit 12 corrects the weight of the prior evaluation function of Equation (1) based on the difference between the prior score (improvement score) and the result score to obtain an improved evaluation function.

In step S316, the scoring unit 12 overwrites and corrects the prior score (improvement score) based on the result score, changes the ranking, and returns to step S36 (FIG. 3A).

Steps S315 and S316 are repeatedly executed until the service is satisfied by the collected data in step S312. In the first execution of steps S315 and S316, processing is performed on the prior score, and in the second and subsequent processing, processing is performed on the improvement score.

In the above description, the case where the sensor device allocation apparatus 1 designates the camera to the sensor device 2 and assigns the camera to the service has been described. However, if an evaluation function of each sensor device 2 is prepared, the sensor device allocation apparatus 1 may be another sensor device such as an infrared sensor, a temperature sensor, a vibration sensor, or a microphone, and can also perform assignment of a plurality of types of sensors.

<Hardware Configuration>

Figure 4:
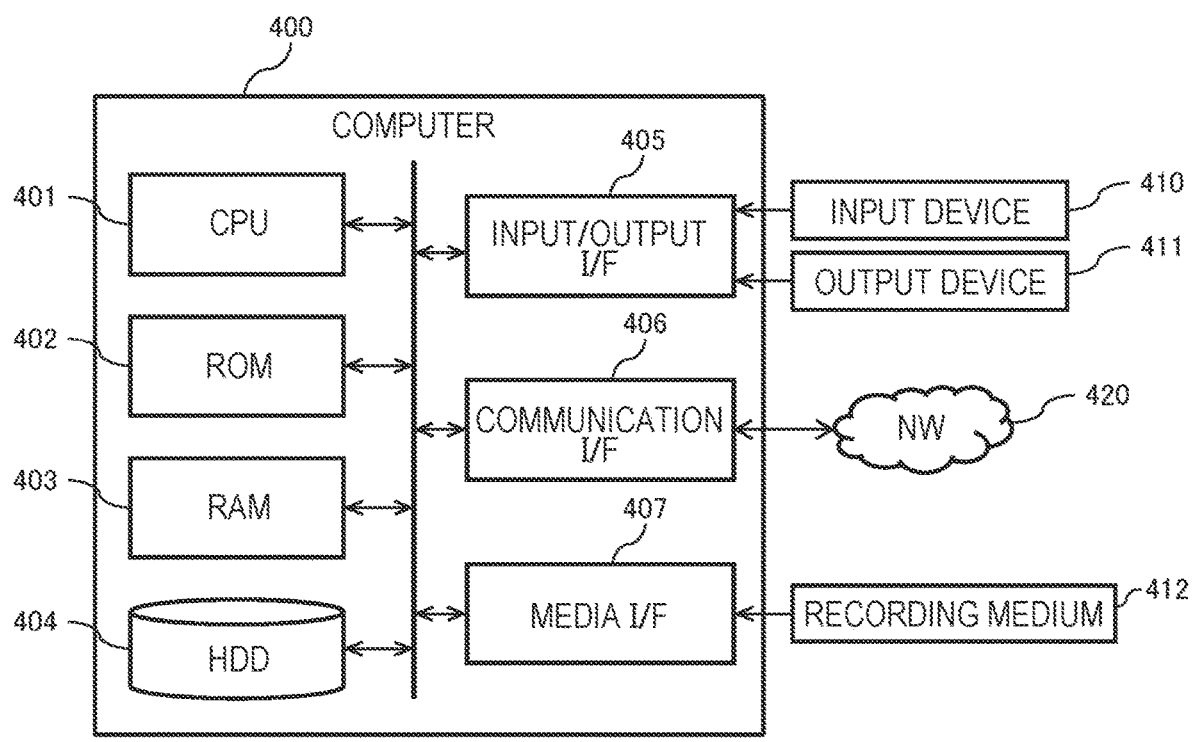
FIG. 4 is a hardware configuration diagram illustrating an example of a computer that implements functions of the sensor device allocation apparatus.

The sensor device allocation apparatus 1 according to the present embodiment is implemented by, for example, a computer 400 as illustrated in FIG. 4.

FIG. 4 is a hardware configuration diagram illustrating an example of the computer 400 that implements the functions of the sensor device allocation apparatus 1 according to the present embodiment. The computer 400 includes a central processing unit (CPU) 401, a read-only memory (ROM) 402, a RAM 403, a hard disk drive (HDD) 404, an input/output interface (I/F) 405, a communication I/F 406, and a media I/F 407.

The CPU 401 operates based on a program (sensor device allocation control program) stored in the ROM 402 or the HDD 404, and controls the scoring 12, the scheduling unit 13, the clustering unit 14, and the like of the sensor device allocation apparatus 1 illustrated in FIG. 1. The ROM 402 stores a booting program to be executed by the CPU 401 when the computer 400 starts, a program related to the hardware of the computer 400, or the like.

The CPU 401 controls an input device 410 such as a mouse or a keyboard, and an output device 411 such as a display via the input/output I/F 405. The CPU 401 acquires data from the input device 410 and outputs created data to the output device 411 via the input/output I/F 405. A graphics processing unit (GPU) or the like may be used as a processor in conjunction with the CPU 401.

The HDD 404 stores a program to be executed by the CPU 401, data to be used by the program, and the like. The communication I/F 406 receives data from another device via a communication network (for example, a network (NW) 420), outputs the data to the CPU 401, and transmits data generated by the CPU 401 to another device via the communication network.

The media I/F 407 reads a program or data stored in a recording medium 412, and outputs the program or data to the CPU 401 via the RAM 403. The CPU 401 loads a program related to target processing from the recording medium 412 on the RAM 403 via the media I/F 407 and executes the loaded program. The recording medium 412 is an optical recording medium such as a digital versatile disc (DVD) or a phase change rewritable disk (PD), a magneto-optical recording medium such as a magneto-optical disk (MO), a magnetic recording medium, a conductor memory tape medium, a semiconductor memory, or the like.

For example, in a case where the computer 400 functions as the sensor device allocation apparatus 1 according to the present embodiment, the CPU 401 of the computer 400 realizes the function of the sensor device allocation apparatus 1 by executing a program loaded on the RAM 403. The HDD 404 stores the data in the RAM 403. The CPU 401 reads the program related to the target processing from the recording medium 412, and executes the program. In addition, the CPU 401 may read a program related to the target processing from another device via a communication network (the NW 420).

<Effects>

Hereinafter, effects of the sensor device allocation apparatus 1 and the like according to the present invention will be described.

A sensor device allocation apparatus 1 that allocates a sensor device 2 to an IoT service of the present invention includes a scoring unit 12 that performs ranking of sensor devices 2 satisfying a service requirement by an evaluation function based on specification conditions of the sensor devices 2 and a scheduling unit 13 that determines a control law of the sensor devices 2 ranked by the scoring unit 12, in which the scheduling unit 13 determines whether a service is satisfied based on collected data of the sensor device 2 collected based on the control law, and the scoring unit 12 corrects the evaluation function and repeats ranking of the sensor devices 2 when the scheduling unit 13 determines that the service is not satisfied.

In addition, a sensor device allocation method for allocating a sensor device 2 to an IoT service of the present invention includes a step of scoring an evaluation function based on a specification condition of the sensor device 2 to rank sensor devices 2 that satisfy a service requirement, a step of scheduling the ranked sensor devices 2 to determine a control law for the sensor devices 2, a step of determining whether the sensor device 2 satisfies a service based on collected data of the sensor device 2 collected according to the control law, and a step of modifying, when it is determined that the service is not satisfied, the evaluation function and repeating performing of ranking of the sensor device 2.

As a result, when it is determined that the service is not satisfied, the evaluation of the actual collected data is fed back, the evaluation function is corrected, and the ranking of the sensor device 2 is repeated, so that the accuracy of the control law is improved.

Furthermore, the sensor device allocation apparatus 1 further includes the clustering unit 14 that prepares an evaluation function group for the number of clusters by clustering the evaluation functions, and the scoring unit 12 ranks the sensor devices 2 by any evaluation function group of the evaluation function group for the number of clusters.

In addition, the sensor device allocation method further includes a step of clustering the evaluation functions to prepare evaluation function groups corresponding to the number of clusters, and a step of scoring an evaluation function included in any evaluation function group of the evaluation function group as an evaluation function based on a specification condition of the sensor device 2 and ranking sensor devices 2 satisfying a service requirement.

As a result, since the number of evaluation functions to be scored can be limited, the processing load can be reduced, and the accuracy of the score can be improved.

Furthermore, the sensor device allocation apparatus 1 further includes a service portal unit 11 that is connected to a service request source of the IoT service, scores the evaluation function group to notify the service request source of an order close to a service requirement, and acquires the evaluation function group selected by the service request source, in which the scoring unit 12 performs ranking of sensor devices 2 by the evaluation function group notified via the service portal unit 11 and selected by the service request source.

In addition, the sensor device allocation method further includes a step of scoring evaluation function groups and obtaining an order close to a service requirement to notify a service request source of the order, a step of acquiring an evaluation function group selected by the service request source, and a step of scoring an evaluation function included in the evaluation function group selected by the service request source as an evaluation function based on a specification condition of the sensor device 2 to rank sensor devices 2 satisfying the service requirement.

As a result, since the service request source selects the evaluation function group to be scored, the selection accuracy of the sensor device 2 can be improved.

The present invention is not limited to the above-described embodiments, and many modifications can be made by those skilled in the art within the technical idea of the present invention.

REFERENCE SIGNS LIST

1 Sensor device allocation apparatus
2a, 2b, 2 Sensor device
3a, 3b, 3 Service request unit
31a, 31b, 31 Data analysis unit
11 Service portal unit
12 Scoring unit
13 Scheduling unit
14 Clustering unit
15 Database
16 Sensor control unit
17 Sensor data storage unit

The invention claimed is:

1. A sensor device allocation apparatus configured to allocate a sensor device to an Internet-of-Things (IoT) service, the sensor device allocation apparatus comprising one or more processors configured to execute instructions that cause the sensor device allocation to perform operations comprising:
performing ranking of sensor devices satisfying a service requirement by an evaluation function based on specification conditions of the sensor devices;
determining a control law of the sensor devices ranked by the one or more processors;
determining whether a service is satisfied based on collected data of the sensor device collected based on the control law; and
correcting the evaluation function and repeating the ranking of the sensor devices when the one or more processors determine that the service is not satisfied.

2. The sensor device allocation apparatus according to claim 1, the operations further comprising:
clustering the evaluation functions to prepare evaluation function groups corresponding to the number of clusters, wherein
the one or more processors perform the ranking of the sensor devices by any one of the evaluation function groups.

3. The sensor device allocation apparatus according to claim 2, the operations further comprising:
connecting to a service request source of the IoT service, scoring the evaluation function group to notify the service request source of an order close to a service requirement, and acquiring the evaluation function group selected by the service request source, wherein
the one or more processors perform the ranking of sensor devices by the evaluation function group of which it is notified via the one or more processors and selected by the one or more processors.

4. A sensor device allocation method for allocating a sensor device to an Internet-of-Things (IOT), the method comprising:
scoring an evaluation function based on a specification condition of the sensor device to rank sensor devices that satisfy a service requirement;
scheduling the ranked sensor devices to determine a control law for the sensor devices;
determining whether the sensor device satisfies a service based on collected data of the sensor device collected according to the control law; and
modifying, when it is determined that the service is not satisfied, the evaluation function and repeating performing of ranking of the sensor device.

5. The sensor device allocation method according to claim 4, further comprising:
clustering the evaluation functions to prepare evaluation function groups corresponding to the number of clusters; and
scoring an evaluation function included in any evaluation function group of the evaluation function group as an evaluation function based on a specification condition of the sensor device and ranking sensor devices satisfying a service requirement.

6. The sensor device allocation method according to claim 5, further comprising:
scoring the evaluation function group and obtaining an order close to a service requirement to notify a service request source of the order;
acquiring an evaluation function group selected by the service request source; and
scoring an evaluation function included in the evaluation function group selected by the service request source as an evaluation function based on a specification condition of the sensor device to rank sensor devices satisfying the service requirement.

7. A non-transitory computer-readable medium storing with instructions that, when executed by one or more processors, cause the one or more processors to perform operations comprising:
scoring an evaluation function based on a specification condition of a sensor device to rank sensor devices that satisfy a service requirement;
scheduling the ranked sensor devices to determine a control law for the sensor devices;
determining whether the sensor device satisfies a service based on collected data of the sensor device collected according to the control law; and
modifying, when it is determined that the service is not satisfied, the evaluation function and repeating performing of ranking of the sensor device.

* * * * *